United States Patent [19]

Stephenson et al.

[11] Patent Number: 4,939,638
[45] Date of Patent: Jul. 3, 1990

[54] TIME SLICED VECTOR PROCESSING

[75] Inventors: R. Ashley Stephenson, Tewksbury; Christopher Moriondo, Marlboro; Kevin B. Normoyle, Ashland, all of Mass.

[73] Assignee: Stellar Computer Inc., Newton, Mass.

[21] Appl. No.: 159,250

[22] Filed: Feb. 23, 1988

[51] Int. Cl.⁵ .......................... G06F 9/30; G06F 13/00
[52] U.S. Cl. .................................. 364/200; 364/228.1; 364/231.8; 364/232.21; 364/281.6
[58] Field of Search ... 364/200 MS File, 900 MS File

[56] References Cited

U.S. PATENT DOCUMENTS

| | | | |
|---|---|---|---|
| 3,916,383 | 10/1975 | Malcolm | 364/200 |
| 3,934,232 | 1/1976 | Curley et al. | 364/200 |
| 3,972,029 | 7/1976 | Bailey | 364/200 |
| 3,980,992 | 9/1976 | Levy et al. | 364/200 |
| 4,197,579 | 4/1980 | Otis, Jr. et al. | 364/200 |
| 4,354,227 | 10/1982 | Hays, Jr. et al. | 364/200 |
| 4,661,900 | 4/1987 | Chen et al. | 364/200 |

OTHER PUBLICATIONS

Denelcor, Heterogeneous Element Processor Principles of Operation, Apr., 1981, Part No. 9000001.

*Primary Examiner*—Eddie P. Chan
*Attorney, Agent, or Firm*—Fish & Richardson

[57] ABSTRACT

Access by a plurality of instruction streams to a shared resource is managed by preassigning to each instruction stream, arbitration time slots in each of which only one instruction stream is eligible to request access to the resource.

8 Claims, 3 Drawing Sheets

| time | $t_1$ | $t_2$ | $t_3$ | $t_4$ | $t_5$ | $t_6$ | $t_7$ |
|---|---|---|---|---|---|---|---|
| Stream 1 | P1 | P2 | P3 | P4 | P1 | P2 | P3 |
| Stream 2 | P4 | P1 | P2 | P3 | P4 | P1 | P2 |
| Stream 3 | P3 | P4 | P1 | P2 | P3 | P4 | P1 |
| Stream 4 | P2 | P3 | P4 | P1 | P2 | P3 | P4 |

FIG. 2

| time | | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|---|
| Stream 1 | Ph. | P1 | P2 | P3 | P4 | P1 | P2 | P3 | P4 | P1 | P2 | P3 | P4 |
| | Op. | ARB | EXE | EXE | | ARB | | | | ARB | EXE | | |
| Stream 2 | Ph. | P4 | P1 | P2 | P3 | P4 | P1 | P2 | P3 | P4 | P1 | P2 | P3 |
| | Op. | | ARB | | | | ARB | | | | ARB | EXE | EXE |
| Stream 3 | Ph. | P3 | P4 | P1 | P2 | P3 | P4 | P1 | P2 | P3 | P4 | P1 | P2 |
| | Op. | | | ARB | EXE | | | ARB | | | | ARB | |
| Stream 4 | Ph. | P2 | P3 | P4 | P1 | P2 | P3 | P4 | P1 | P2 | P3 | P4 | P1 |
| | Op. | | | | ARB | EXE | EXE | EXE | EXE | EXE | | | ARB |
| Stream in Vector Unit | | idle | 1 | 1 | 3 | 4 | 4 | 4 | 4 | 4 | 1 | 2 | 2 |

FIG. 4

TIME SLICED VECTOR PROCESSING

BACKGROUND OF THE INVENTION

This invention relates to managing access by a plurality of instruction streams to a shared resource.

The shared resource may be, for example, a vector processor. In vector processing, the same operation is performed on each element of a set (vector) of data. In a vector add operation, for example, the elements of a first data vector are added to the respective elements of a second data vector. Vector processing typically requires specialized hardware, such as a floating point processor and vector registers, together known as a "vector unit".

In multiple processor systems, multiple instruction streams on multiple pipelines often require a vector operation at the same time. Some systems have separate vector units dedicated to the respective instruction streams. Others share a single vector unit among the multiple pipelines. The multiple instruction streams run asynchronously with respect to one another on their pipelines and request access to the vector unit whenever they need to perform a vector operation (i.e., on an "as-needed" basis). Thus, when two or more streams simultaneously request access to the vector unit, neither stream obtains access to the vector unit right away; rather, arbitration is performed between them. The arbitration utilizes valuable vector unit operating time and thus limits throughput.

SUMMARY OF THE INVENTION

In a general feature of the invention, access by a plurality of instruction streams to a shared resource (e.g., a vector unit) is managed by preassigning, to each instruction stream, arbitration time slots in each of which only one instruction stream is eligible to request access to the resource.

Preferred embodiments include the following features. An instruction stream is approved for access to the resource only if that instruction stream is requesting access during one of its preassigned time slots and the resource will be available. Execution of the instruction stream is temporarily suspended if the instruction stream is requesting access during one of the preassigned time slots and the resource will not be available; thereafter, during a subsequent time slot preassigned to that stream, it is again permitted to request access to the resource. The preassigned time slots of different said instruction streams are interleaved to assure that each instruction stream regularly is eligible to request access. During each preassigned slot the data for the present instruction in the stream associated with that slot is provided to the resource so that if that stream is approved for access, the resource will be able to proceed to execute the present instruction without waiting for the data to become available. The execution of each instruction in each instruction stream proceeds in a sequence of a predetermined number of phases, and the preassigned time slots correspond to a prespecified one of the phases.

Thus, only a single vector unit is needed to serve multiple streams, and it is used very efficiently. The scheme takes advantage of the pipelined time-sliced organization of the instruction streams.

Other advantages and features will become apparent from the following description of the preferred embodiment and from the claims.

DESCRIPTION OF THE PREFERRED EMBODIMENT

Figure 1:
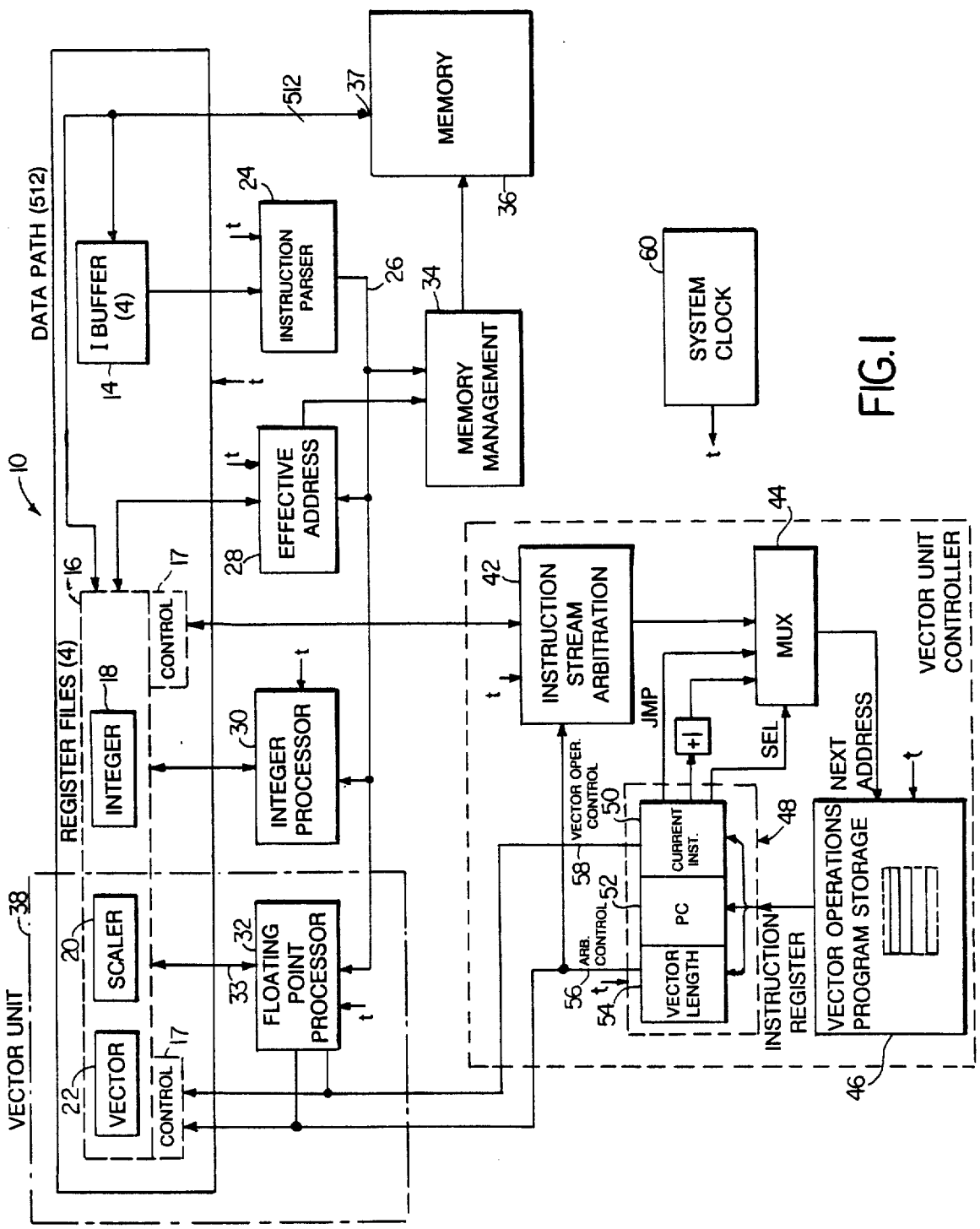
Figure 3:
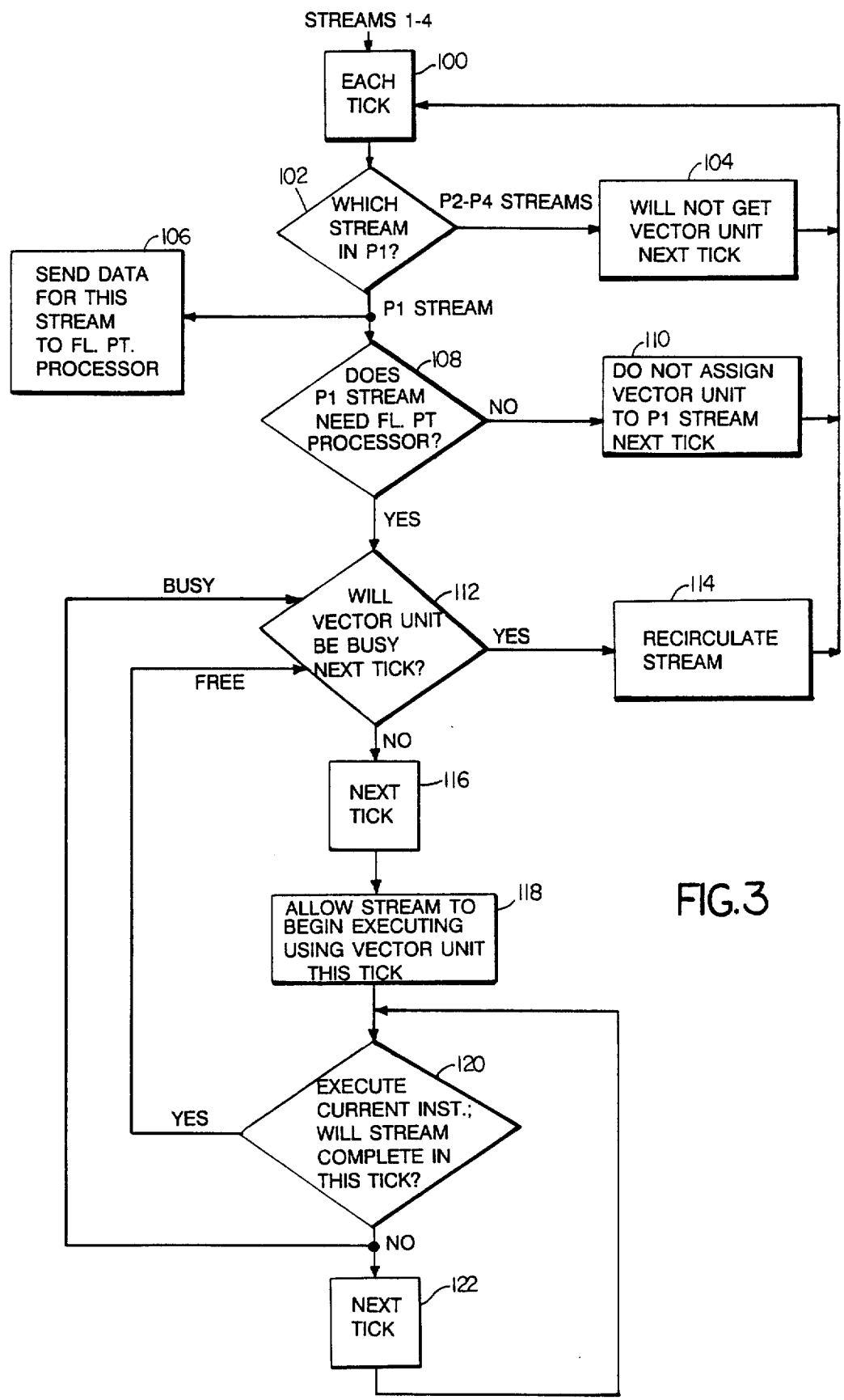

We first briefly describe the drawings.
FIG. 1 is a block diagram of a synchronous-pipeline, multi processor system.
FIG. 2 is a timing diagram.
FIG. 3 is a flow chart of vector unit time slicing.
FIG. 4 is a timing diagram of vector unit time slicing.

STRUCTURE AND OPERATION

Referring to FIG. 1, a synchronous pipeline, multiprocessor (SPMP) 10 has a single central processing unit (CPU) shared by four instruction streams. SPMP 10 is organized around a 512-bit data path 12, implemented as 32 application specific integrated circuits (ASICs) (i.e, ate arrays). Data path 12 includes, for each stream, an instruction buffer (IBuffer) 14 and a set of register files 16, each register file including 32 integer registers 18, eight scaler registers 20, and six 32-element vector registers 22.

The four IBuffers 14 sequentially and in cycles feed instructions in a pipeline manner from the four streams to a single instruction parser 24 (i.e., the instructions are delivered in the order: stream 1, stream 2, stream 3, stream 4, stream 1, etc.), which decodes the instructions and passes them on instruction pipeline 26 to effective address (EA) unit 28, data path 12 (specifically, register files 16 via register file control 17), integer or general purpose processor 30, and a single vector/scaler floating point processor 32. Instruction pipeline 26 also feeds memory management unit 34, which also receives effective (i.e., virtual) memory addresses generated by EA unit 28 in response to the decoded instructions. Memory management unit 34 controls the addressing, reading, and writing of system memory 36, which is connected to data path 12 via a 512-bit wide port 37.

The single floating point processer 32 is shared by the four streams and, together with scaler registers 20 and vector registers 22, comprises a single vector unit 38. The operation of vector unit 38 is controlled by a vector unit controller 40, which, among other functions, manages access to vector unit 38 among the four streams of the pipeline.

Vector unit controller 40 comprises an instruction stream arbitrator 42, which determines, on a clock pulse (i.e., tick) by clock pulse basis, which instruction stream is to be given access to the remainder of vector controller 40 for possible use of vector unit 38. The decoded instruction of the winning stream is applied to a 3-to-1 multiplexer (mux) 44, the output of which supplies the next address for a stored vector operations program 46. The addressed instructions of vector operations program 46 are applied to instruction register 48, which contains the current instruction 50, program counter 52, and information on the vector length 54, i.e., the length of the vector to be operated on.

Instruction register 48 produces an arbitration control signal on line 56 based on vector length 52 (more specifically, based on the number of elements remaining in a particular vector operation in progress). The arbitration control signal is applied to stream arbitrator 42, floating point processor 32, and vector registers 22 and scaler registers 20 via register file control 17. Vector operations are controlled by a vector operation control signal produced on line 58, based on current instruction 50, and applied to floating point processor 32, and scaler registers 20 and vector registers 22 via register file control 17.

Instruction register 48 also provides a select (SEL) signal and a pair of inputs for mux 44, an address increment (i.e., +1) signal on line 51 and an address jump (JMP) signal on line 53, which control the sequence in which the vector operations program instructions are executed.

Referring also to FIG. 2, a system clock 60 provides overall timing for SPMP system 10, applying a 20 MHz system clock signal (t) to the various units of the system, as shown in FIG. 1. The execution stage for instructions appearing in the pipeline occurs in four phases (P1-P4). The phases for the four streams are offset in any given clock tick, $t_i$. For example, at $t_1$, stream 1 is in phase one (P1), stream 2 is in phase four (P4), stream 3 is in phase three (P3), and stream 4 is in phase two (P2). The phase of each stream is incremented with each clock tick $t_i$. At $t_2$, streams 1-4 are in phases P2, P1, P4, P3, respectively. At start-up, each unit in SPMP 10 (for example, stream arbitrator 42 and the devices in vector unit 38) is informed of the initial phase of each stream, and the units independently track the phase of each stream in the pipeline with each tick of system clock 60. This knowledge of relative stream phases is important, because execution of certain instructions may only occur in a given phase. For example, vector unit 38 may begin processing a vector instruction only when a stream is in phase two (P2).

Referring to FIG. 3, vector controller 40, and specifically instruction stream arbitrator 42, manages access to vector unit 38 among the multiple streams in the following manner. At each tick (100), stream arbitrator 42 determines (102) which stream is in P1. Stated alternately, each stream contends for access to vector unit 38 only when it is in phase P1. Only the stream in P1 during a given tick ti may gain access to vector unit 38 in the next tick ($t_{i+1}$); no other stream can begin using vector unit 38 at tick $t_{i+1}$ (104). Thus only the stream which is going to enter P2 (the only phase in which a vector operation may commence) at the next tick ($t_{i+1}$) is the only stream given new access to vector unit 38 by arbitrator 42 in the previous tick ($t_i$). This prevents a stream from obtaining access to vector unit 38 when that stream is in, for example, P3, thus preventing that stream from uselessly engaging vector unit 38 for three clock ticks while it is progressing from P3 to P4 to P1 and finally to P2. During these three ticks, another stream which enters P2 with a vector instruction would be blocked.

At the same time that stream arbitrator 42 is arbitrating between streams, register file control 17 is driving the data contained in the vector registers 22 (and/or scaler registers 20 of the stream presently in P1 to floating point processor 32 via bus 33 (106). If the stream in P1 has a vector instruction ready to execute in P2, and that stream gets access to vector unit 38, the vector instruction can be immediately executed without having to wait for the data to be sent to floating point processor 32. That is, on each tick the vector (and/or scaler) data of the stream then in P1 is readied for a possible vector operation by floating point processor 32, on the assumption that the stream will get access to vector unit 38 on the next tick. Thus, the data of the only stream that can begin to use vector unit 38 at that next tick (the stream in P2 at that tick) is always applied to floating point processor 32 on the previous tick ($t_i$), thereby improving throughput.

If the instruction of the stream in P1 does not require the use of vector unit 38 (108), then the stream will not need, and will not be given (110), access to vector unit 38 on the next tick, and vector unit 38 will be idle during the next tick.

If, on the other hand, the instruction stream does require use of vector unit 38 on the next tick, instruction stream arbitrator 42 determines whether vector unit 38 will be busy during that tick (112), that is, when the winning stream enters P2. This is done in response to the arbitration control signal on line 56, based on the length of a vector operation for a stream previously given access to vector unit 38 and how many elements of the vector are yet to be processed. When a stream is given access to vector unit 38, one of the first instructions of the vector operation routine (in the vector operations program) sets vector length 54 of instruction register 48. Then, as each instruction is executed, program counter 52 decrements the "elements to go" by one. If vector unit 38 has more than one vector element to go before completing the operation, the arbitration control signal on line 56 informs arbitrator 42 that vector unit 38 will be busy when the stream currently in P1 enters P2. Thus, that stream is denied access to vector unit 38 and will be recirculated (114) back to P1 when the stream reaches P4 to again seek access to vector unit 38.

If, on the other hand, vector unit 38 either is idle or has only one element of a vector operation to complete, the arbitration control signal on line 56 tells arbitrator 42 that vector unit 38 will be free during the next tick (i.e., when the stream currently in P1 enters P2). The control signal also readies vector registers 22 (and/or scaler registers 20) to actually send that stream's data to floating point processor 32, and instructs floating point processor 32 to get ready to begin a new vector operation. Instruction register 48 also selects mux 44 to couple the instruction stream from arbitrator 42 to address vector operations program 46 and begin executing its vector operation (118) upon occurrence of the next tick (116) (i.e., when that stream enters P2).

The instruction of vector operations program 46 addressed via mux 44 becomes the current instruction 50 in instruction register 48, and is executed (120) by floating point processor 32 and vector registers 22 and/or possibly scaler registers 20). Based on current instruction 50, instruction register 48 controls mux 44 to either increment (via line 51) to the next address in program 46 or jump (via line 53) to another point in program 46. The "elements to go" count in instruction register 48 is decremented to generate either a vector busy signal (if more than one element remains) or a vector free signal (if one or zero element remains) on line 56 (120).

Assuming another vector element remains, then upon the next tick (122) a current instruction 50 is loaded in register 48 (based either on an increment 51 or on a jump 53), executed (120), and the "elements to go" count is again decremented. If more than one element remains (120), arbitration control line 56 maintains the vector busy signal. The vector free signal is generated if only one vector element remains.

The process continues until the vector free signal is generated by instruction register 48, meaning that the stream currently using vector unit 38 will complete its vector operation this tick and vector unit 38 will be free to begin a vector operation for another stream during the next tick. Stream arbitrator 42 permits the stream in P1 at this time to be coupled to mux 44 (102) and, because vector unit 38 will not be busy next tick (112), that stream is coupled through mux 44 to address vector operations program 46 and access vector unit 38 (118) on the next tick (116).

Referring to FIG. 4, for example, each stream arbitrates (ARB) for vector unit 38 when that stream is in P1. Thus, stream one arbitrates at tick $t_1$. At this time, vector unit 38 is idle; hence instruction register 48 produces a vector free signal, and stream 1 is granted use of vector unit 38.

Stream 1 begins execution (EXE) of its vector operation upon the next tick (i.e., when stream 1 is in P2). Stream 1 contains a two tick vector operation. Thus, when stream 2 arbitrates in tick $t_2$, the "elements to go" count in instruction register 48 shows that stream 1 will not be finished with vector unit 38 on the next tick, and stream 2 is denied access to vector unit 38 and recirculates.

Stream 3 arbitrates in tick $t_3$, which is also the last tick of the vector operation of stream 1. Hence, stream 3 is granted access to vector unit 38 and performs its single tick vector operation during tick $t_4$. When stream 4 enters P1 and arbitrates in tick $t_4$, stream 3 is completing its vector operation and a vector free signal is thus being applied to arbitrator 42. Consequently, stream 4 is granted access to vector unit 38.

Stream 4 contains a five tick vector operation, and thus streams 1, 2, and 3 are denied access to vector unit 38 when they arbitrate in ticks $t_5$, $t_6$, $t_7$, respectively. Stream 4 does not arbitrate in tick $t_8$, because it is using vector unit 38 at that time.

When stream 1 again arbitrates (in tick $t_9$), stream 4 is completing its vector operation. Thus, stream 1 is granted access to vector unit 38 to perform a one-tick vector operation. Stream 2 finally successfully arbitrates in tick $t_{10}$ and executes its two tick vector operation using vector unit 38 during ticks $t_{11}$, $t_{12}$.

The final row of FIG. 4 reveals the efficiency of the arbitration scheme of the invention. From the time that stream 1 is granted access to vector unit 38, different streams execute five different vector operations using vector unit 38 in 11 ticks, with vector unit 38 being kept continually busy with no wasted time during this period.

Other embodiments are within the following claims.

We claim:

1. A method for aiding management of access to a shared resource by a plurality of instruction streams executing in a pipelined manner in a synchronous-pipeline computer, comprising preassigning arbitration time slots to each instruction stream, allowing, in each one of said arbitration time slots, only the instruction stream to which said one arbitration time slot is preassigned to request access to said shared resource, and determining whether an instruction stream that has requested access during its preassigned arbitration time slot will be granted access to said shared resources, said determining step including detecting whether said shared resource will be available, and denying access when said shared resource is not available.

2. The method of claim 1 further comprising approving said one instruction stream for access to said resource only if said instruction stream is requesting access during one of said preassigned time slots and said resource will be available.

3. The method of claim 2 comprising temporarily suspending execution of said one instruction stream, if said instruction stream is requesting access during one of said preassigned time slots and said resource will not be available, and thereafter, during a subsequent time slot preassigned to said stream, permitting said stream to again request access to said resource.

4. The method of claim 1 comprising interleaving the preassigned time slots of different said instruction streams to assure that each said instruction stream regularly is eligible to request access.

5. The method of claim 1 wherein each stream includes instructions that have data associated with them for processing by said shared resource, and further comprising providing to the resource during each preassigned slot the data for a present instruction in the stream associated with that preassigned slot so that if said stream is approved for access to said resource, said resource will be able to proceed to execute said present instruction without waiting for said data to become available.

6. The method of claim 1 wherein the execution of instructions in each said instruction stream proceeds in a sequence of a predetermined number of phases, and said preassigned time slots correspond to a prespecified one of said phases.

7. The method of claim 1 wherein said shared resource comprises a vector unit.

8. The method of claim 2 further comprising:

permitting said approved instruction stream to gain access to said resource and to use said resource for an arbitrary time duration that may exceed a duration of one of said arbitration time slots.

* * * * *